United States Patent
Daoud et al.

(10) Patent No.: US 6,867,371 B2
(45) Date of Patent: Mar. 15, 2005

(54) FIBER CLOSURE SEALING APPARATUS

(75) Inventors: Bassel H. Daoud, Parsippany, NJ (US); Ivan Pawlenko, Holland, PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 139 days.

(21) Appl. No.: 10/421,592

(22) Filed: Apr. 23, 2003

(65) Prior Publication Data

US 2004/0211774 A1 Oct. 28, 2004

(51) Int. Cl.⁷ .................................................. H02G 3/18
(52) U.S. Cl. ................. 174/65 G; 174/65 R; 174/135; 174/151; 16/2.1; 248/56
(58) Field of Search ............................ 174/65 R, 65 G, 174/152 G, 153 G, 151, 135, 65 SS; 248/56; 16/2.1, 2.2; 439/98, 462

(56) References Cited

U.S. PATENT DOCUMENTS

| | | | |
|---|---|---|---|
| 6,143,983 A * | 11/2000 | Burton et al. ............. | 174/65 R |
| 6,354,851 B1 * | 3/2002 | Bachle ......................... | 439/98 |
| 6,374,455 B1 * | 4/2002 | Regele et al. ................. | 16/2.1 |
| 6,444,908 B1 * | 9/2002 | Krall ......................... | 174/65 G |
| 6,495,755 B2 * | 12/2002 | Burton et al. ............. | 174/65 G |
| 6,743,981 B2 * | 6/2004 | Miyakoshi ................ | 174/65 G |
| 6,779,232 B2 * | 8/2004 | Cerul ........................... | 16/2.1 |
| 6,794,574 B2 * | 9/2004 | Gust et al. ................. | 174/65 G |

* cited by examiner

*Primary Examiner*—Dhiru R. Patel

(57) ABSTRACT

Apparatus for enclosing a plurality of fiber optic cables in a sealed environment includes a housing, a lid, a hollow body projecting from the housing, at least one grommet disposed in the hollow body for securing one or more fiber optic cables in an orifice accessed by a slit provided therein and a cap disposed in front of the hollow body to compress the grommet and seal components passing through the grommet into the housing. The grommet is a single body with a plurality of orifices for receiving a plurality of fiber optic cables or a plurality of individually formed grommets each having one orifice.

19 Claims, 7 Drawing Sheets

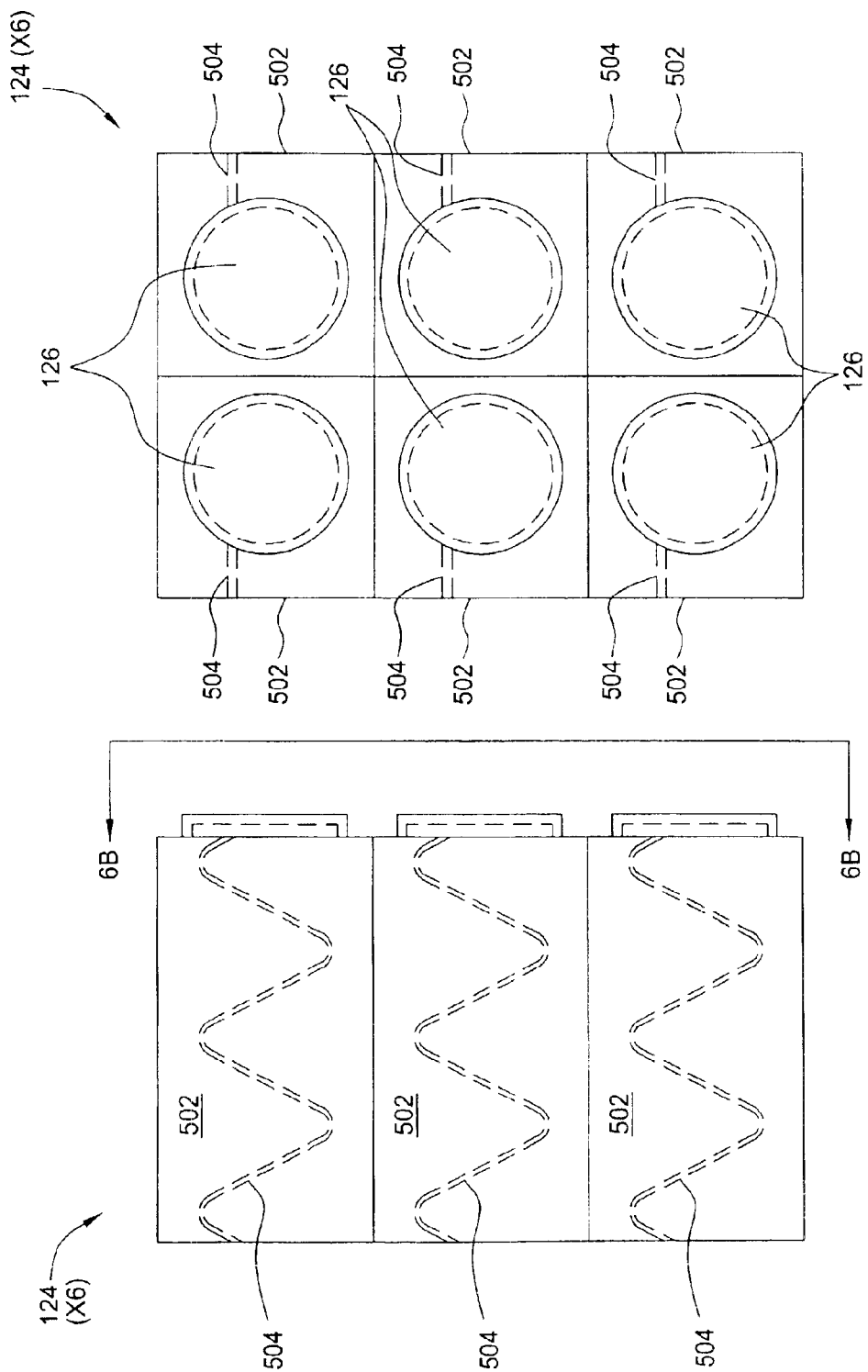

US 6,867,371 B2

FIBER CLOSURE SEALING APPARATUS

FIELD OF INVENTION

The present invention generally relates to optical fiber enclosures and, more particularly, to an optical fiber enclosure having improved sealing capabilities for use in moisture or water prone outdoor environments.

BACKGROUND OF INVENTION

Fiber closures are used in outdoor applications (e.g., in flood zones, manholes for underground utility access and shipboard applications) to protect the terminals and interconnections of fiber optic cables contained within the closure. The fiber closure must be very well sealed to prevent damage to the fiber connections, splices and supporting framework. Prior designs have not been able to suitably seal around multiple fiber cables entering a closure simultaneously. That is, as the number of fiber cables that access a fiber closure increases, so does the number of openings in the fiber closure for water or moisture to enter; thereby possibly leading to fiber damage. One possible solution to the problem of multiple fiber cable sealing is to use heat shrink tubing around each of the cables as they enter an enclosure. Unfortunately, heat shrink tubing is not reusable (thus leading to additional cost and time for accessing a closure or cable each time a cable must be handled) and does not allow for adequate mounting of a plurality of cables within the moisture or water prone environment.

SUMMARY OF THE INVENTION

These and other deficiencies of the prior art are addressed by the present invention of an apparatus for enclosing a plurality of fiber optic cables in a sealed environment including, in one embodiment, a housing, a lid, a hollow body projecting from the housing, at least one grommet disposed in the hollow body for securing one or more fiber optic cables in an orifice accessed by a slit provided therein and a cap disposed in front of the hollow body to compress the grommet and seal components passing through the grommet into the housing. The housing is substantially rectangular in shape and has a front face having an opening where the hollow body projects from. In one embodiment of the invention, the grommet is a single body with a plurality of orifices for receiving a plurality of fiber optic cables. In such embodiment, the grommet has a plurality of slits corresponding to the plurality of orifices for gaining access to the plurality of orifices. In an alternate embodiment of the invention, the grommet is a plurality of individually formed grommets; each grommet comprising one orifice. Each of the plurality of individual grommets has a slit on a side of the grommet for accessing the orifice. In such embodiment, the plurality of individual grommets are grouped in a matrix that is sized to fit in the hollow body. The grommet slit is either a wavy line design cut along one face of the grommet or a straight line design cut along two or more faces of the grommet.

In one embodiment of the invention, the cap has a tray-like shape with a plurality of flanges that correspond to a plurality of flanges provided on the hollow body. In an alternate embodiment, the cap is a flat plate construction. In either embodiment, the cap has a plurality of openings, each cap opening corresponding to a grommet orifice.

The lid is secured to the housing using a plurality of stud and nut combinations or via a hinge assembly and one or more screws passing through the lid into the housing.

BRIEF DESCRIPTION OF THE DRAWINGS

The teachings of the present invention can be readily understood by considering the following detailed description in conjunction with the accompanying drawings, in which:

FIG. 6A depicts a top view of a second embodiment of a grommet associated with the fiber closure sealing apparatus of the subject invention;

FIG. 6B depicts a front elevation view of the grommet of FIG. 6A when viewed along lines 6b—6b of FIG. 6A;

To facilitate understanding, identical reference numerals have been used, where possible, to designate identical elements that are common to the figures.

DETAILED DESCRIPTION OF THE INVENTION

Figure 1:
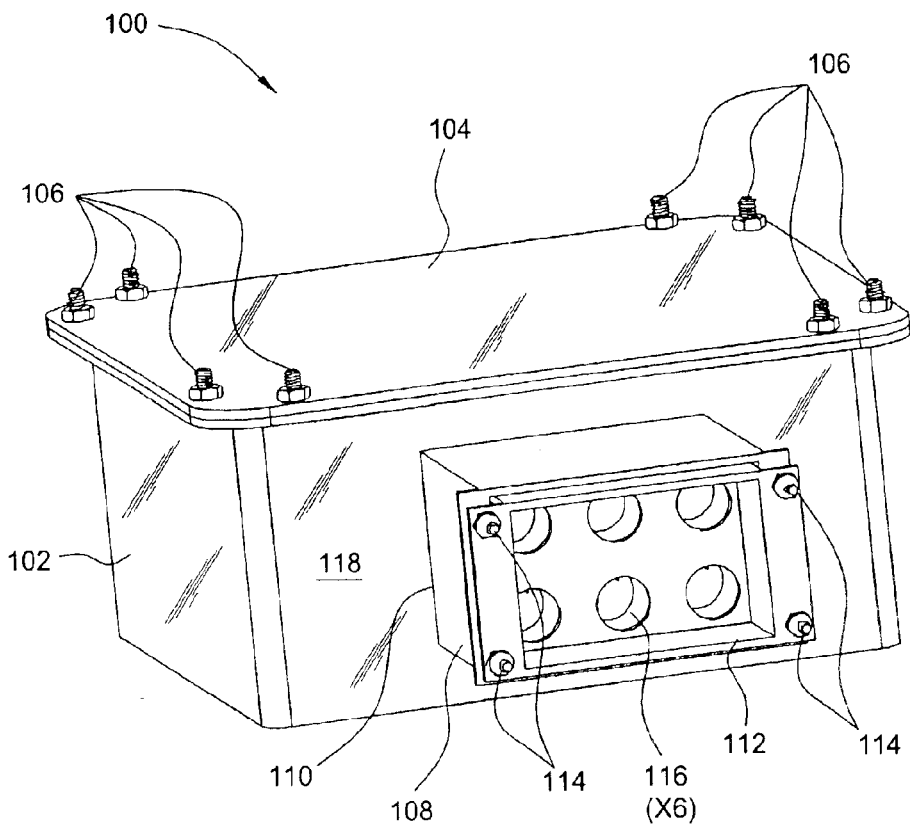
FIG. 1 depicts an isometric view of a first embodiment of a fiber closure sealing apparatus in accordance with the subject invention.

FIG. 1 depicts an isometric view of a first embodiment of the fiber closure sealing apparatus of the subject invention. Specifically, a fiber closure sealing apparatus 100 is shown that is capable of receiving a plurality of fiber optic cables (not shown), fanning out said plurality of fiber optic cables into a plurality of individual optical fibers, terminating such individual optical fibers with connectors to facilitate connections of said optical fibers with a second plurality of individual optical fibers in a weather tight (or otherwise waterproof) environment.

The fiber closure sealing apparatus 100 comprises a housing 102 with a lid 104 disposed over the housing to form an enclosure. The lid 104 is secured to the housing 102 via a plurality of stud and nut combinations 106 provided at strategically placed intervals about the housing 102 with accommodating holes provided in the lid 104. The housing 102 or lid 104 may have a gasket or other type of sealing member, (not shown) provided therebetween to provide a substantially watertight seal between the housing 102 and the lid 104.

The housing 102 has a front face 118 that has an opening 110. The opening 110 is a plurality of housing orifices 132 formed in the front face 118 (see FIG. 4). The opening 110 communicates with a pass-through body 108 that extends perpendicularly away from the front face 118. Specifically, the pass-through body 108 is an interface for receiving a plurality of fiber optic cables from an outside environment and providing them to the interior of the fiber closure sealing apparatus 100 to make the appropriate connections therein. In one embodiment, the pass-through body 108 is a substantially rectangular body to facilitate design, fabrication and construction of the apparatus 100. The pass-through body 108 is terminated by an end cap 112. Specifically, the end cap 112 is secured to the pass-through body 108 by a second plurality of stud and nut combinations 114. Additionally, the end cap 112 is provided with a plurality of openings 116 for accommodating fiber optic cables passing between an outside environment and the apparatus 100.

Figure 2:
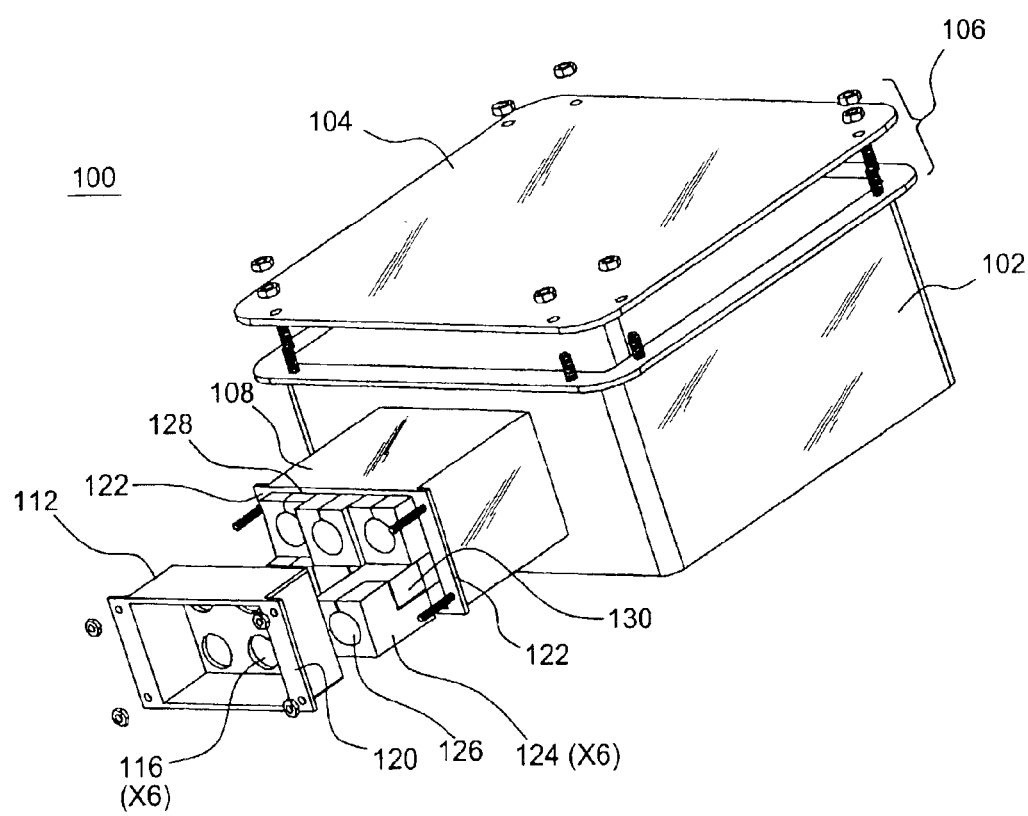
FIG. 2 depicts a second isometric view, partially exploded, of the apparatus of FIG. 1.

FIG. 2 depicts a second isometric view, partially exploded, of the apparatus 100 of FIG. 1. The lid 104 is shown removed from the housing 102 by disassembling the stud and nut combinations 106 so as to gain access to the interior of housing 102 for the purposes of connecting individual fiber optic cables (described in greater detail below). The pass-through body 108 and end cap 112 are shown in greater detail as follows. Specifically, and in one embodiment of the invention, the end cap 112 is a substantially rectangular, tray-shaped component that has a plurality of flanges 120 extending therefrom. The end cap 112 is dimensioned such that it fits inside of pass-through body 108 at a front opening 128. The pass-through body 108 also includes a plurality of flanges 122 provided at the front opening 128. The pass-through body flanges 122 coincide with the end cap flanges 120 thereby providing the necessary mounting and sealing surfaces to join these two components.

Figure 4:
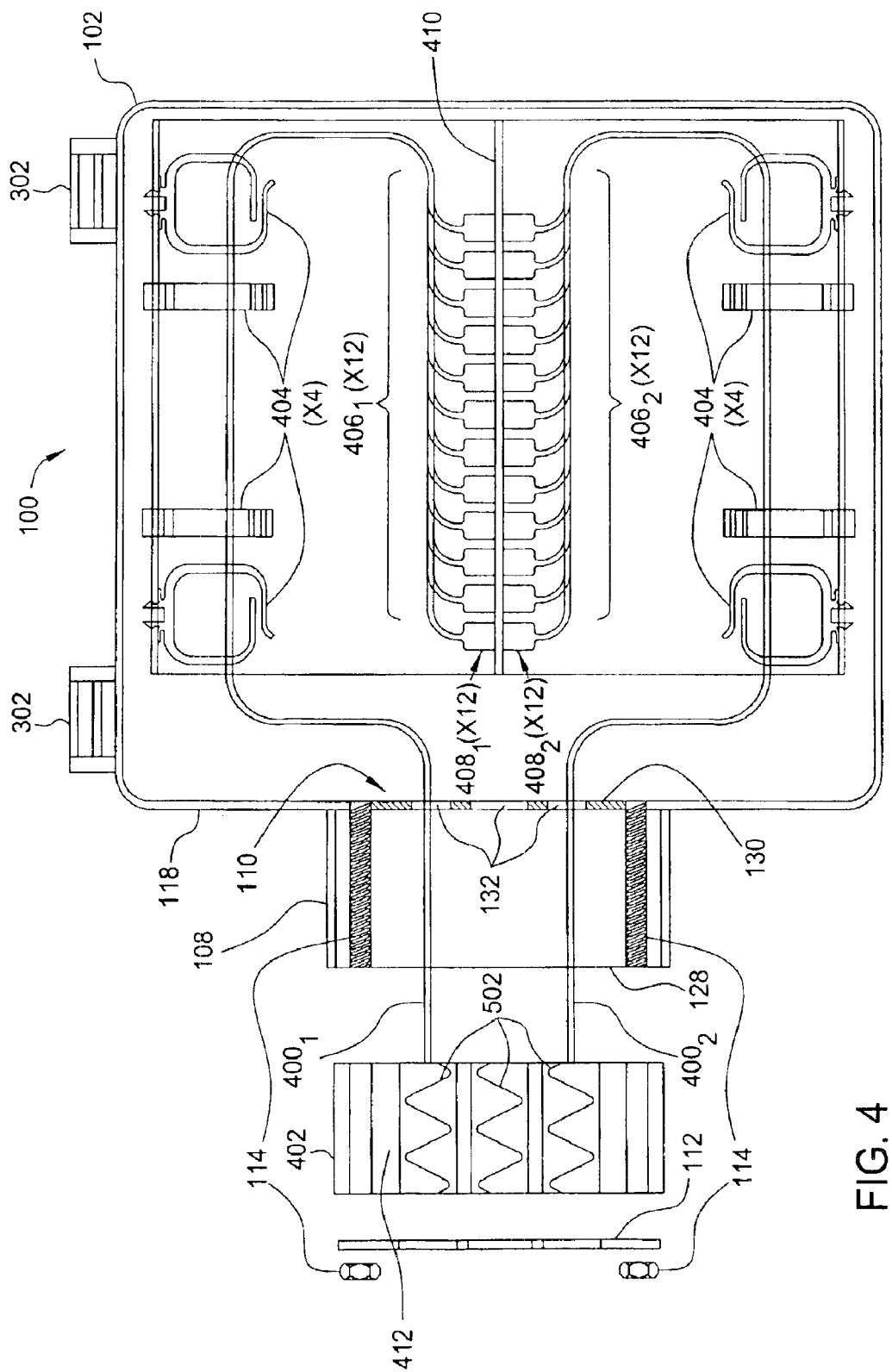
FIG. 4 depicts a top view of the apparatus depicted in FIG. 3 with a lid removed.

A plurality of cable grommets 124 are disposed within the pass-through body 108 from the pass-through body front opening 128 extending to a pass-through body rear opening 130 (not seen FIGS. 1 or 2, but seen in FIG. 4). In one embodiment of the subject invention, six cable grommets 124 are provided in the pass-through body 108. One skilled in the art will realize that any number of cable grommets may be designed and placed in the pass-through body 108 as necessary for holding the desired number of cables. Each of the cable grommets 124 includes a cable grommet orifice 126 which extends longitudinally through the cable grommet 124 for retaining a fiber optic cable in the pass-through body 108 from the pass-through body front opening 128 to the pass-through body rear opening 130. Each cable grommet orifice 126 is axially aligned with a corresponding housing orifice 132 and end cap opening 116.

One skilled in the art will realize that there can be various alternate embodiments that are within the spirit and scope of the invention. For example, the fiber closure sealing apparatus 100 need not have a lid 104, but can be formed of a housing 102 made of two housing halves or a plurality of housing sides that are held together by some type of fastening means or permanently attached to one another. The opening 110 can be one or more openings placed on any of the halves or housing sides for optimization of a particular design. The shape of the apparatus 100 need not be a rectangular one, but any desired shape (irregular, asymmetric, round, oval, square and the like) to optimize the design for a particular application.

Figures 5A, 5B:
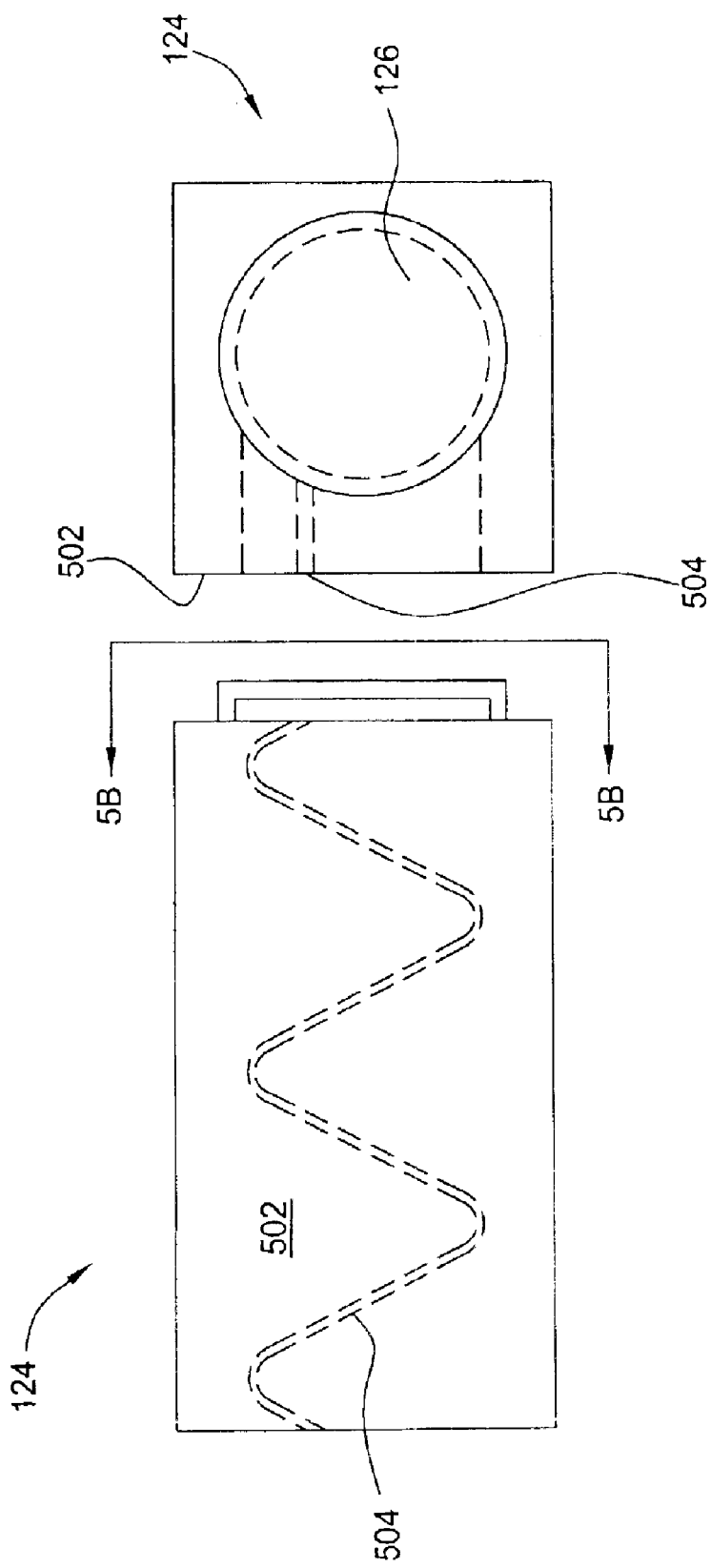
FIG. 5A depicts a top view of a first embodiment of a grommet associated with the fiber closure sealing apparatus of the subject invention.
FIG. 5B depicts a front elevation view of the grommet of FIG. 5A when viewed along lines 5b—5b of FIG. 5A.

Details of the cable grommet 124 are depicted in FIGS. 5–7. Specifically, FIG. 5A shows a side view of one embodiment of the cable grommet 124 for receiving a fiber optic cable. The cable grommet 124 has a cable threading side 502 which includes a slit 504. The slit 504 facilitates separating the cable threading side 502 temporarily so as to thread the fiber optic cable into the cable grommet orifice 126. FIG. 5B depicts a front view of the cable grommet 124 as viewed along lines 5B—5B of FIG. 5A. Specifically, as one pulls apart the cable threading side 502 along the slit 504 a fiber optic cable is snugly provided in the cable grommet orifice.

Accordingly, a single cable grommet 124 serves as a building block for securing a single fiber optic cable in the fiber closure sealing apparatus 100. In one particular example of the cable grommet 124, the slit 504 has the form of a straight slit extending longitudinally along the threading side 502, then making a right angle turn towards the edge of the cable grommet 124 to an adjacent face 130 (this particular embodiment seen more distinctly in FIG. 2). In an alternate embodiment of the cable grommet 124, the slit 504 is formed as a wavy line cutout along the threading side 502. The wavy line form may take the shape of a substantially sinusoidal type curve, but one skilled in the art will realize that any form of the slit is possible so long as its provides access to the cable grommet orifice 126 and provides for a substantially tightly sealed structure as explained below.

FIGS. 6A and 6B depict respectively side views and front views of a plurality of cable grommets 124 used in a specific embodiment of the invention. Specifically, six cable grommets 124 are shown provided in an array of three columns by two rows so as to secure six individual fiber optic cables. The grommets are arranged in pairs such that their respective cable threading sides 502 are opposite one another so as to facilitate threading of the fiber optic cable through their respective slits 504. In instances where there are less than six fiber cables accessing the apparatus 100, a "blank" grommet (having no grommet orifice) replaces one or more cable grommets 124. Once the threading operation is completed, the plurality of grommets 124 is placed into the pass-through body 108 (with the cables secured therein) and is threaded into the housing 102. Each of the plurality of cable openings 116 in the end cap 112 coincide with a cable grommet orifice 126. Accordingly, as end cap 112 is placed in pass-through body front opening 128 and secured to the pass-through body 108, a compressive force is applied by the end cap 112 to the plurality of cable grommets 124 (backed up against front face 118) thereby creating a weather tight (water tight, moisture-proof and the like) seal between the cables, grommets 124, and pass-through body 108.

Figure 3:
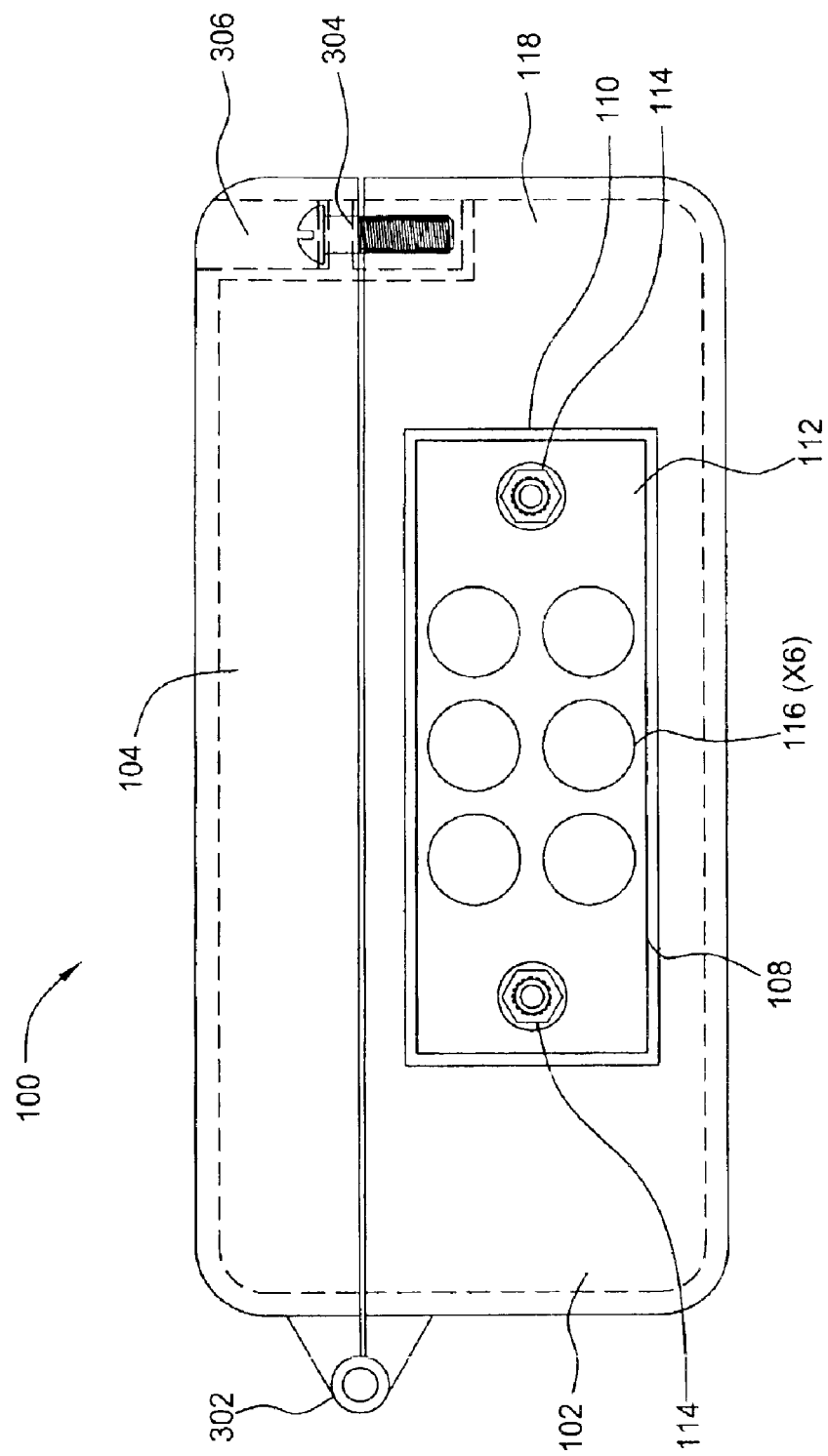
FIG. 3 depicts a front elevation view of a second embodiment of the fiber closure sealing apparatus in accordance with the subject invention.

FIG. 3 depicts a front elevation view of a second embodiment of the fiber sealing closure apparatus 100 in accordance with the subject invention. Specifically, this second embodiment includes a housing 102 and a lid 104 as described earlier; however, the lid 104 is not secured to the housing 102 by a plurality of stud and nut combinations, but by a hinge assembly 302 attached to one side of the lid 104 and housing 102. The hinged lid 104 is secured to the housing 102 by one or more fasteners 304 (e.g., screw, nut and bolt combination and the like) provided in a recess 306 in the hinged lid 104. An appropriate gasket or sealing member (now shown) is also provided either on housing 102 or lid 104 in the manner prescribed earlier to seal the outside environment from the interior of the apparatus 100. Additionally, in this embodiment, the end cap 112 is of a slightly different configuration than the one described in the first embodiment. Specifically, the end cap 112 is a flat plate type component that is secured to the pass-through body 108 by two second stud and nut combinations 114 disposed at either end of the plate.

Additional features of the pass-through body 108 and cable grommets are seen in FIG. 4. More specifically, the pass-through body 108 is depicted as a rectangular body having a pass-though body rear opening 130 communicating with the front face opening 110 of front face 118 of the housing 102. The partially exploded view of FIG. 4 shows a grommet assembly 402 replacing the plurality of individual cable grommets 124 seen in the first embodiment. More specifically, grommet assembly 402 is a substantially solid block of material provided with the appropriate plurality of slits 502 provided on opposite faces of the grommet assembly 402 for accommodating any desired number of fiber optical cables. In the specific depicted embodiment of FIG. 4, three slits 502 are shown on a first face 412 on the top side of grommet assembly 402. It will be understood by those skilled in the art that there could be additional slits on a side face or bottom face of the grommet assembly 402 for accommodating additional optical fiber cables. Additionally, the flat face plate type end cap 112 is more readily seen in FIG. 4.

When a fiber optic cable $400_1$, is threaded into a slit 502 of one of the cable grommet orifices 126, it is then passed into the housing 102 for appropriate termination and connection to a second fiber optic cable $400_2$. Namely, the first fiber optic cable $400_1$ is threaded through a plurality of clips 404 so as to secure the fiber to prevent unnecessary physical bending of the optical cable to prevent damage thereto. The first fiber optic cable $400_1$, then fans out into a plurality of individual optical fibers $406_1$, and in one particular embodiment depicted shows twelve individual optical fibers fanning out from a typical ribbon cable. Each of the individual optical fibers $406_1$, is terminated with an optical connector $408_1$ which is then attached to a frame 410 disposed within the housing 102.

A corresponding number of second fiber optic connectors $408_2$ are connected to the frame 410. Each of the corresponding second fiber optic connectors $408_2$ are attached to a second plurality of individual optical fibers $406_2$ which are then fanned-in to the second fiber optic cable $400_2$. In this particular embodiment, the second fiber optic cable $400_2$ is a ribbon cable having twelve individual optical fibers contained therein. The second fiber optic cable $400_2$ is then threaded through a plurality of clips 404 along the frame so as to physically limit movement bending or damage thereto. The second fiber optic cable $400_2$ is then routed outside the enclosure 102 through the pass-through body 108 via one of the slits 502 in the grommet assembly 402. As discussed in the first embodiment, the end cap 112 in the second embodiment is so dimensioned so as to place a compressive forces against the grommet assembly 402 when it is secured to the pass-through body 108 by the plurality of stud and nut combinations 114. It will be understood that the interior of the housing 102 in the first embodiment is substantially similar to that of the second embodiment described and depicted in FIG. 4. That is, the necessary frame hardware and connectors are provided so that any one of a plurality of incoming optical fiber cables can be fanned out, connected to the frame and have a corresponding number of return optical fibers connected to the frame and bundled together to form an output optical fiber cable.

Figure 7A:
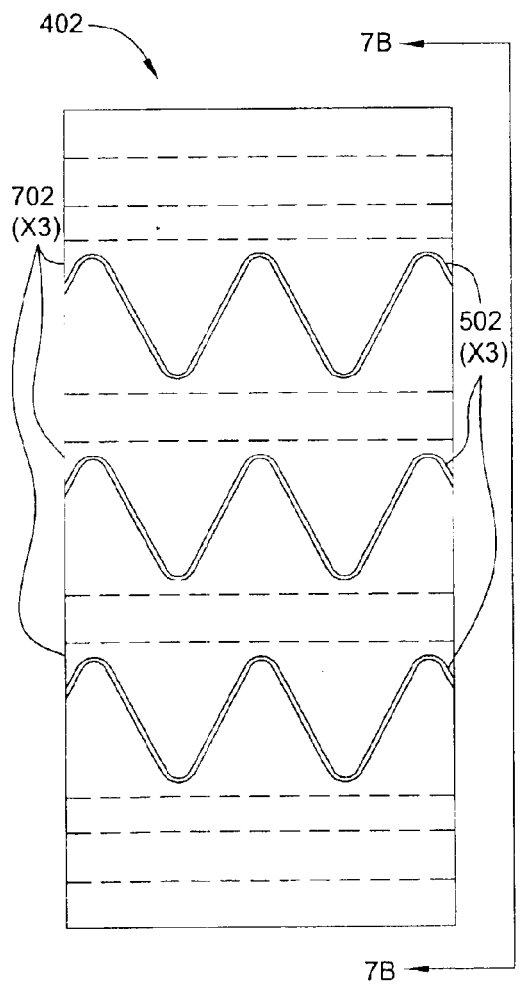
FIG. 7A depicts a top view of a third embodiment of a grommet associated with the fiber closure sealing apparatus of the subject invention.
Figure 7B:
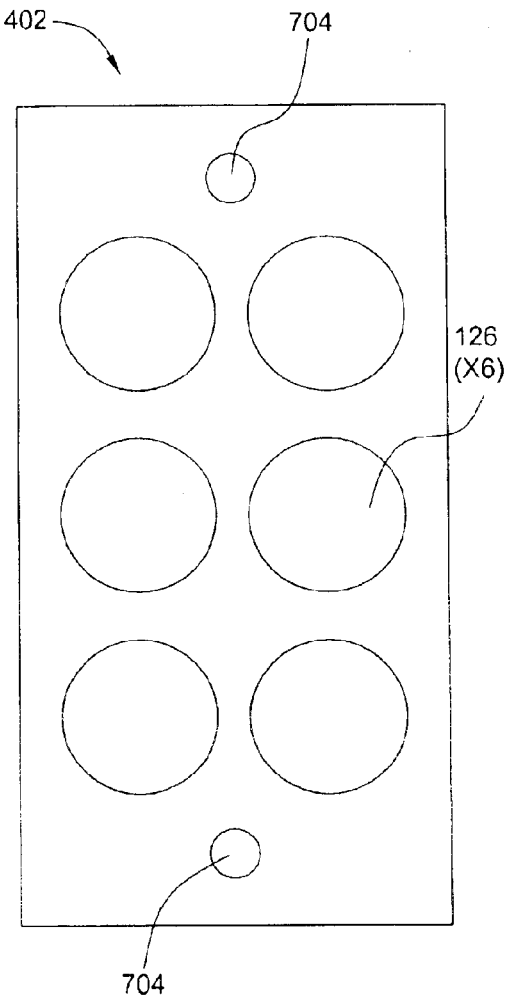
FIG. 7B depicts a front elevation view of the grommet of FIG. 7A when viewed along lines 7b—7b of FIG. 7A.

FIGS. 7A and 7B depict a more detailed view of the second embodiment of the invention including the grommet block assembly 402. Specifically, grommet block assembly 402 is a unitary component having a plurality of grommet portions 702 arranged within the block. FIG. 7A shows a side view of the grommet block assembly 402 depicting three grommet areas each having its own slit 502 provided therein. One skilled in the art will realize that any number of grommet areas 702 can be provided and in this specific embodiment there are six such locations, three on opposing sides of the grommet block. FIG. 7B is a view of the grommet block assembly 402 looking along lines 7B—7B of FIG. 7A. Specifically, the six grommet areas 702 are more readily seen by viewing the corresponding cable grommet orifice 126 provided in the block assembly 402. Grommet mounting holes 704 are provided on either end of the grommet block 402 so as to provide room for accommodating the second stud and nut assemblies passing through the pass-through body 108 when such grommet block assembly 402 is used to secure the plurality of fiber optic cables. One skilled in the art will realize that any number of areas 702 and corresponding cable grommet orifices 126 may be provided in the grommet block assembly 402. In one embodiment of the invention, rubber is used as the material of which the grommets 124 or grommet assembly 402 is formed. Preferably, the material is selected from the group consisting of silicone rubber, neoprene rubber and neoprene foam rubber. However, one skilled in the art will realize that other materials are suitable for the purposes of holding cables and sealing them in the apparatus 100.

Although various embodiments that incorporate the teachings of the present invention have been shown and described in detail herein, those skilled in the art can readily devise many other varied embodiments that still incorporate these teachings.

What is claimed is:

1. An apparatus comprising:
    a housing;
    a lid;
    a hollow body projecting from the housing;
    at least one grommet having an orifice, said grommet disposed in the hollow body for securing one or more fiber optic cables in the orifice accessed by a slit provided in said grommet; and
    a cap disposed in front of the hollow body to compress the grommet and seal components passing through the grommet into the housing.

2. The apparatus of claim 1, wherein the housing is substantially rectangular in shape.

3. The apparatus of claim 2, wherein the housing further comprises a front face having an opening where the hollow body projects from.

4. The apparatus of claim 3, wherein the hollow body projects perpendicularly from the front face of the housing.

5. The apparatus of claim 1 wherein the grommet is a single body with a plurality of orifices for receiving a plurality of fiber optic cables.

6. The apparatus of claim 5 wherein the grommet further comprises a plurality of slits corresponding to the plurality of orifices for gaining access to the plurality of orifices.

7. The apparatus of claim 1 wherein the grommet further comprises a plurality of individually formed grommets; each grommet comprising one orifice.

8. The apparatus of claim 7 wherein each of the plurality of individual grommets further comprises a slit on a side of the grommet for accessing the orifice.

9. The apparatus of claim 8 wherein the plurality of individual grommets are grouped in a matrix; the matrix sized to fit in the hollow body.

10. The apparatus of claim 1 wherein the cap further comprises a tray-like shape further comprising a plurality of flanges that correspond to a plurality of flanges provided on the hollow body.

11. The apparatus of claim 1 wherein the cap is a flat plate construction.

12. The apparatus of claim 1 wherein the cap further comprises a plurality of openings, each cap opening corresponding to a grommet orifice.

13. The apparatus of claim 1 wherein the lid is secured to the housing using a plurality of stud and nut combinations.

14. The apparatus of claim 1 wherein the lid is secured to the housing via a hinge assembly and one or more screws passing through the lid into the housing.

15. The apparatus of claim 1 wherein the grommet slit is a wavy line design.

16. The apparatus of claim 1 wherein the grommet slit is a straight line construction.

17. The apparatus of claim 1 wherein the at least one grommet is fabricated from a material selected from the group consisting of silicone rubber, neoprene rubber and neoprene foam rubber.

18. An optical fiber interconnection sealing apparatus comprising:

a multi-part housing defining an enclosure;

one or more hollow bodies projecting from the housing;

at least one grommet having an orifice, said at least one grommet disposed in each of the one or more hollow bodies for securing one or more fiber optic cables in the orifice accessed by a slit provided in said at least one grommet; and a cap disposed in front of each of the one or more hollow bodies to compress said at least one grommet and seal components passing through said at least one grommet into the housing.

19. The apparatus of claim 18 wherein the multi-part housing further comprises two halves.

* * * * *